Patented Sept. 23, 1930

1,776,671

UNITED STATES PATENT OFFICE

KARL SCHÖLLKOPF, OF DUSSELDORF-OBERKASSEL, AND ARTHUR SERINI, OF DUSSELDORF-HEERDT, GERMANY, ASSIGNORS TO RHEINISCHE KAMPFER-FABRIK GESELLSCHAFT MIT BESCHRÄNKTER HAFTUNG, OF DUSSELDORF-OBERKASSEL, GERMANY

PROCESS FOR MAKING INACTIVE MENTHOL

No Drawing. Original application filed June 29, 1927, Serial No. 202,458, and in Germany December 15, 1926. Divided and this application filed September 20, 1928. Serial No. 307,335.

This application refers to improvements in isomer of the inactive menthol, making it and manuafacture of inactive menthol, and is a division of our co-pending application Serial No. 202,458 filed on the 29th day of June, 1927.

The transformation of the solid inactive isomenthol described in our co-pending application may be effected by the action of mentholates of the alkali forming metals at temperatures above 100 degrees centigrade, the solid inactive isomenthol being employed by itself or in admixture with other isomers of inactive menthol and separating the crude inactive menthol from the resulting mixture by physical methods described in the U. S. Patent No. 1,625,771 of April 19th, 1927 for instance by freezing-out or fractional distillation, purifying the crude inactive menthol by conversion into esters as described in U. S. Patent No. 1,672,346.

*Example 1.*—Three parts of metallic sodium are dissolved in 100 parts of solid inactive isomenthol, and the mixture of isomenthol and sodium isomentholate is heated at 180 degrees centigrade for about 24 hours. The reaction product is then driven off by means of steam. The inactive menthol is separated from the resulting mixture of isomers by freezing out or fractional distillation, and is further purified by way of the esters. The isomeric menthols left from the separation and purification are subjected to further transformation.

*Example 2.*—A mixture of 50 parts of solid inactive isomenthol and 50 parts of a mixture of liquid isomeric menthols left over from Example 1, is treated with the corresponding sodium mentholates as in Example 1, and the resulting menthols mixture is subjected to further treatment as described therein.

We claim:

1. The process for manufacturing inactive menthol, the racemate of natural menthol, which consists in heating solid inactive isomenthol with mentholates of the alkali forming metals and separating from the reaction product crude inactive menthol.

2. The process for manufacturing inactive menthol, the racemate of natural menthol, which consists in heating solid inactive isomenthol with mentholates of the alkali forming metals and separating from the reaction product crude inactive menthol by fractional distillation.

3. The process for manufacturing inactive menthol, the racemate of natural menthol, which consists in heating solid inactive isomenthol mixed with other isomers of inactive menthol, with mentholates of the alkali forming metals and separating from the reaction product crude inactive menthol.

4. The process for manufacturing inactive menthol, the racemate of natural menthol, which consists in heating solid inactive isomenthol mixed with other isomers of inactive menthol, with mentholates of the alkali forming metals and separating from the reaction product crude inactive menthol by fractional distillation.

5. The process for manufacturing inactive menthol, the racemate of natural menthol, which consists in heating solid inactive isomenthol with mentholates of the alkali forming metals and separating from the reaction product crude inactive menthol by fractional crystallization.

6. The process for manufacturing inactive menthol, the racemate of natural menthol, which consists in heating solid inactive isomenthol mixed with other isomers of inactive menthol, with mentholates of the alkali forming metals and separating from the reaction product crude inactive menthol by fractional crystallization.

In testimony whereof we affix our signatures.

KARL SCHÖLLKOPF.
ARTHUR SERINI.